(12) United States Patent
Powar et al.

(10) Patent No.: US 12,301,431 B2
(45) Date of Patent: *May 13, 2025

(54) SYSTEM ARCHITECTURE FOR DYNAMICALLY RENDERING A CUSTOMIZED USER INTERFACE ON A MOBILE DEVICE

(71) Applicant: PayPal, Inc., San Jose, CA (US)

(72) Inventors: Suraj Powar, San Jose, CA (US); Anand Vaidyanathan, San Jose, CA (US); Kalyan Narasimhan, Sunnyvale, CA (US); Saleem Faneeband, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,168

(22) Filed: Jan. 18, 2024

(65) Prior Publication Data

US 2024/0235956 A1 Jul. 11, 2024

Related U.S. Application Data

(63) Continuation of application No. 17/473,803, filed on Sep. 13, 2021, now Pat. No. 11,909,602, which is a
(Continued)

(51) Int. Cl.
*G06F 3/048* (2013.01)
*G06F 3/0484* (2022.01)
(Continued)

(52) U.S. Cl.
CPC .............. *H04L 41/22* (2013.01); *G06F 3/048* (2013.01); *G06F 3/0484* (2013.01); *G06F 9/451* (2018.02);
(Continued)

(58) Field of Classification Search
None
See application file for complete search history.

(56) References Cited

U.S. PATENT DOCUMENTS

D623,655 S  9/2010 Jewitt et al.
8,281,372 B1  10/2012 Mdal
(Continued)

OTHER PUBLICATIONS

International Preliminary Report on Patentability for International Application No. PCT/US2019/042085 mailed on Feb. 4, 2021, 9 pages.
(Continued)

*Primary Examiner* — Xuyang Xia
(74) *Attorney, Agent, or Firm* — Haynes and Boone, LLP (57) ABSTRACT

A plurality of user segments is defined. Each user segment has a respective profile corresponding to one or more characteristics shared by one or more users. A plurality of elements of a user interface for a mobile application is defined. Each user segment is associated with a different subset of the elements. A first request is received to display the user interface on a first mobile device of a first user. In response to the first request, user data of the first user is analyzed. Based on the analysis, a first user segment to which the first user belongs is determined. The mobile application is then instructed to display the user interface according to a first customized layout on the first mobile device. The first customized layout includes a first subset of elements associated with the first user segment.

20 Claims, 6 Drawing Sheets

Related U.S. Application Data continuation of application No. 16/041,296, filed on Jul. 20, 2018, now Pat. No. 11,121,935.

(51) Int. Cl.
| | |
|---|---|
| *G06F 9/451* | (2018.01) |
| *G06Q 20/32* | (2012.01) |
| *H04L 41/22* | (2022.01) |
| *H04L 67/306* | (2022.01) |

(52) U.S. Cl.
CPC ....... *G06Q 20/3265* (2020.05); *H04L 67/306* (2013.01)

(56) References Cited

U.S. PATENT DOCUMENTS

| | | |
|---|---|---|
| D771,654 S | 11/2016 | Chaudhri et al. |
| D775,632 S | 1/2017 | Van Den Berg et al. |
| 9,547,854 B2 | 1/2017 | Serrano |
| D785,012 S | 4/2017 | Jou |
| D790,578 S | 6/2017 | Hatzikostas |
| D819,646 S | 6/2018 | Jow et al. |
| D821,440 S | 6/2018 | Li |
| D822,689 S | 7/2018 | Amidei et al. |
| D822,690 S | 7/2018 | Amidei et al. |
| D831,041 S | 10/2018 | Anton et al. |
| D837,815 S | 1/2019 | Biberger et al. |
| D841,024 S | 2/2019 | Clediere et al. |
| D842,871 S | 3/2019 | Clediere et al. |
| D842,888 S | 3/2019 | Krainer et al. |
| D842,889 S | 3/2019 | Krainer et al. |
| D847,146 S | 4/2019 | Hilhorst et al. |
| 10,360,554 B2 | 7/2019 | Mercille |
| 10,776,777 B1* | 9/2020 | Maeng ................. G06Q 20/326 |
| 2002/0098840 A1 | 7/2002 | Hanson et al. |
| 2009/0164287 A1 | 6/2009 | Kies et al. |
| 2010/0192212 A1* | 7/2010 | Raleigh ................. H04M 15/88 726/7 |
| 2011/0231878 A1 | 9/2011 | Hunter et al. |
| 2013/0072153 A1 | 3/2013 | Lawson et al. |
| 2013/0185285 A1* | 7/2013 | Shuman ................. G06F 16/248 707/722 |
| 2014/0089446 A1 | 3/2014 | Mallikarjunan et al. |
| 2014/0365908 A1 | 12/2014 | Smoak et al. |
| 2015/0040026 A1 | 2/2015 | Sergunin |
| 2015/0128020 A1 | 5/2015 | Chavez et al. |
| 2016/0232600 A1 | 8/2016 | Purves |
| 2016/0357366 A1 | 12/2016 | Migos et al. |
| 2017/0013103 A1 | 1/2017 | Jakobsen et al. |
| 2018/0067641 A1 | 3/2018 | Lerner et al. |
| 2018/0121072 A1 | 5/2018 | Baldi et al. |
| 2018/0121566 A1 | 5/2018 | Filippi et al. |
| 2018/0188945 A1 | 7/2018 | Garmark et al. |
| 2018/0330363 A1 | 11/2018 | Paek |
| 2019/0095436 A1* | 3/2019 | Martinazzi .............. G06T 11/60 |
| 2019/0280943 A1* | 9/2019 | Kaw ................... H04L 41/0843 |

OTHER PUBLICATIONS

International Search Report and Written Opinion for International Application No. PCT/US2019/042085 mailed on Nov. 7, 2019, 12 pages.

Invitation to Pay Additional Fees for International Application No. PCT/US2019/042085 mailed on Sep. 20, 2019, 2 pages.

\* cited by examiner

SYSTEM ARCHITECTURE FOR DYNAMICALLY RENDERING A CUSTOMIZED USER INTERFACE ON A MOBILE DEVICE

CROSS-REFERENCE TO RELATED APPLICATION

The present application is a continuation of U.S. patent application Ser. No. 17/473,803, filed Sep. 13, 2021, which is a continuation of U.S. patent application Ser. No. 16/041,296, filed Jul. 20, 2018, now U.S. Pat. No. 11,121,935, the disclosures of which are incorporated herein by reference in their entirety.

BACKGROUND

Field of the Invention

The present invention generally relates to a system architecture for rendering a user interface on a mobile computing device, and more particularly to dynamically generating and displaying customized user interface elements for a mobile application running on a mobile computing device, according to various embodiments.

Related Art

Rapid advances have been made in the past several decades in the fields of computer technology and telecommunications, and businesses and end users now engage in electronic activities more than ever. Many of these electronic activities may be conducted using mobile applications running on a mobile device. Typically, a user may interact with the mobile application via a user interface displayed on a screen of the mobile device, for example using touchscreen gestures and/or voice commands, etc. However, the design and functionalities of user interfaces of conventional mobile applications are "hard coded" into the mobile application. For example, all the users of a mobile application will experience the same user interface design or layout and must interact with the user interface in the same way. This type of design may be unnecessarily rigid and does not take the different needs of different users into account. What is needed is a different architecture for configuring and displaying the user interface of mobile applications dynamically, so that each user may experience a different user interface that is specifically customized for that user.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to an architecture that dynamically configures a mobile application installed on a mobile device to display customized user interface layouts for different users, or even for the same user under different circumstances. In more detail, in recent years, a variety of mobile applications have been developed that run on mobile platforms, such as on smartphones or tablet computers (e.g., the Apple™ iPhone™, the Apple™ iPad™, or other smartphones and/or tablet computers running Google's™ Android™ platform). These mobile applications may be used to perform functions involving gaming, social media, electronic transactions, web browsing, media consumption, productivity management, mobile banking, file storage, file editing, E-learning, etc. Typically, each mobile application has a user interface that allows the user to interact with the mobile application, for example to let the user navigate to various screens or execute certain tasks.

However, conventional mobile applications may have fixed user interfaces, where the layout of the user interface is "hard coded" into the mobile application. For example, the mobile application (running on the mobile device) itself may contain all the information necessary to configure and/or display a user interface layout, and that layout remains the same not only for the same user, but also for different users as well. As such, conventional mobile applications generally have a "one-size-fits-all" type of user interface design, which unfortunately does not account for the different needs among different users, or even the changing needs of the same user depending on the circumstances.

The present disclosure overcomes the problem discussed above by implementing a novel architecture that customizes the layout of a mobile application user interface not only for different users, but also for the same user depending on the context in which the user interacts with the mobile application. In contrast to conventional mobile applications where the user interface design is "hard coded" into the mobile application itself, the mobile application of the present disclosure communicates with a remote server and displays a dynamically configured user interface under instructions sent from the server.

For example, the server analyzes the user's profile, behavior, and/or the context in which the user is requesting the interaction with the mobile application. Based on the analysis, the server determines which user interface elements would be appropriate or suitable for that user under the circumstances. The server then sends instructions to the mobile application on how to display the user interface, which is customized to that specific user's profile, behavior, and/or the context or environment surrounding the user. In doing so, the present disclosure improves the functionality of a computer, for example by enhancing the versatility and contextual-awareness of a generic mobile device. Further, due to the small screen sizes on mobile devices, as compared with desktop monitors, a static or "one-size-fits-all" display may omit content that may be important to a user, as more fundamental or universal content may take up the limited display area. With a larger screen, more content may be displayed, such that a higher likelihood exists that a user may find desirable content on the display, even though the same content is displayed to everyone. Thus, the solution, in some embodiments, addresses a technical problem specific to mobile computing devices with smaller user interfaces, such as smart phones. The various aspects of the present disclosure are discussed in more detail with reference to FIGS. 1-6.

Figure 1:
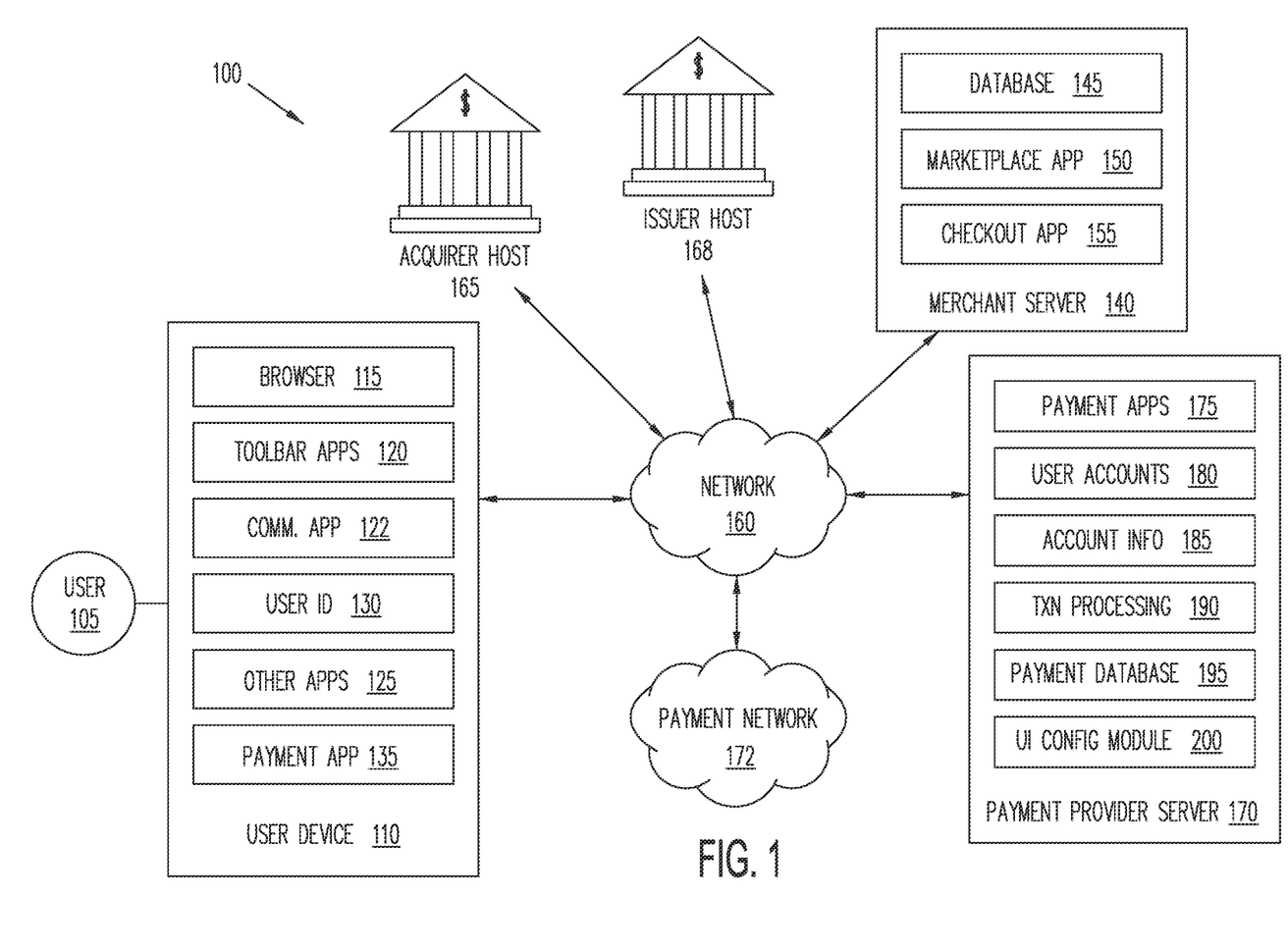
FIG. 1 is a block diagram of a networked system according to a various aspects of the present disclosure.

FIG. 1 is a block diagram of a networked system or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal, Inc. of San Jose, CA. However, the payment provider server 170 is merely a non-limiting example of a server that can interact with and configure a mobile application. In other embodiments, the payment provider server 170 may be used to interact with various other types of mobile applications, not just mobile transaction or online banking types of mobile applications.

A user 105, such as a consumer, may utilize user device 110 to perform an electronic transaction using the payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Again, the transaction herein is not limited to a financial context, but may involve actions performed in gaming, social media viewing, web browsing, media consumption, etc. as well. In addition, although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality headset, or that talk to a smart phone with unique hardware configurations and running appropriate software, laptop computer, and/or other types of computing devices capable of transmitting and/or receiving data, such as an iPhone™ or an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications 125 to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may install and execute a payment application 135 received from the payment service provider 170 to facilitate payment processes. The payment application 135 may allow a user to send payment transaction requests to the payment service provider, which includes communication of data or information needed to complete the request, such as funding source information.

In various embodiments, any one of the browser 115, the toolbar applications 120, the communications application 122, the other applications 125, and the payment application 135 may be implemented as the mobile application that displays a dynamically changing and customized user interface via instructions from a server, such as from the payment provider server 170.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, the payment provider server 170 may retrieve data from the user device 110, analyze the data to determine suitable user interface elements that should be displayed on the user device 110, and send instructions to the user device to display those user interface elements. These functionalities may be implemented by a user interface configuration module 200, which will be discussed in more detail below with reference to FIG. 2. Alternatively, some of these functionalities may also be implemented at least in part by the payment apps 175, or by the transaction process 190, or by a combination thereof.

Still referring to FIG. 1, the payment network 172 may be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
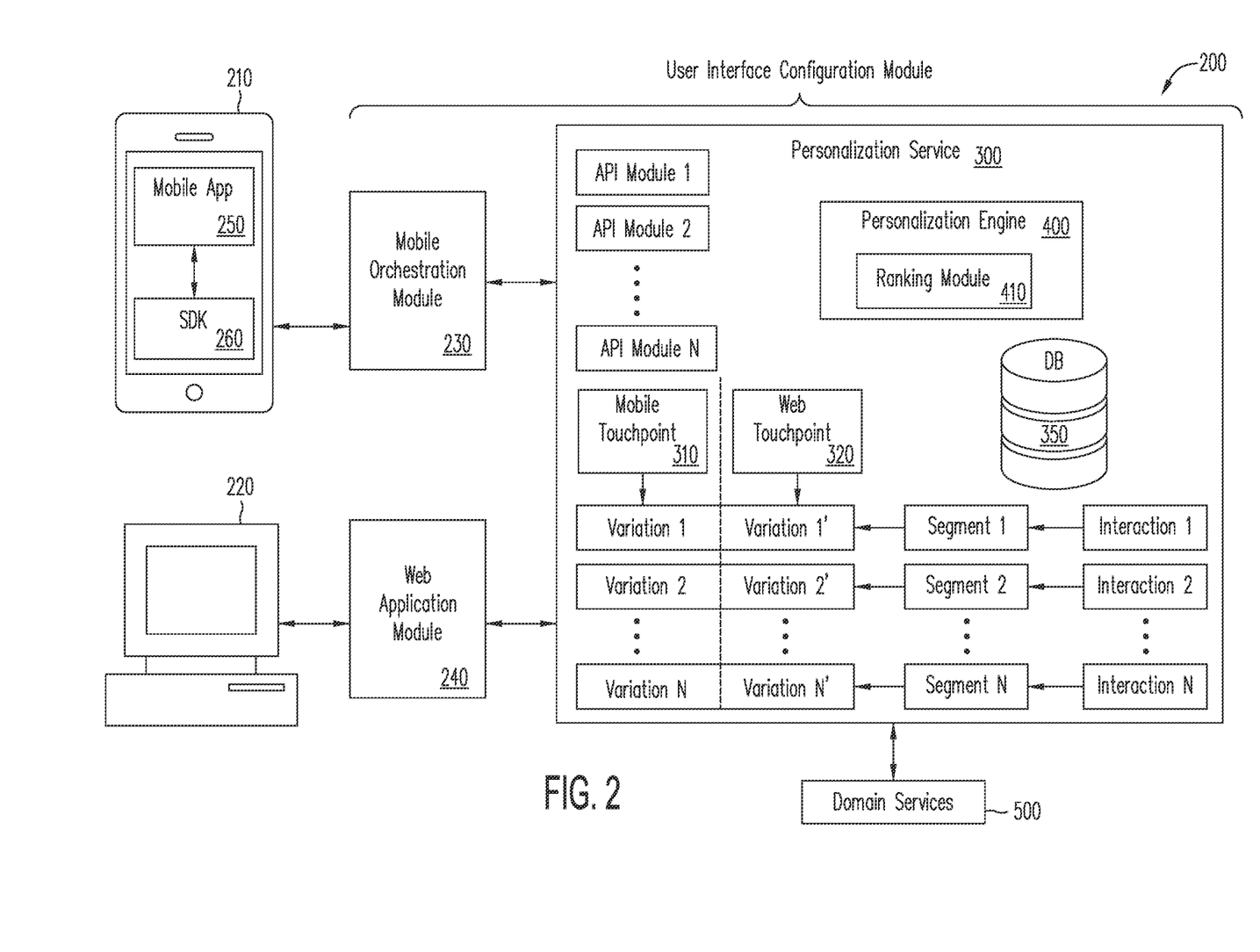
FIG. 2 is a block diagram of an architecture for dynamically generating and rendering customized user interfaces according to various aspects of the present disclosure.

FIG. 2 is a simplified block diagram illustrating the contents of the user interface configuration module 200 and how it interacts with certain user devices. For example, one type of user device may be a mobile device 210, which may be an embodiment of the user device 110 discussed above in association with FIG. 1. In various embodiments, the mobile device 210 may be a smartphone such as the Apple™ iPhone™ or a table computer such as the Apple™ iPad™. Another type of user device may be a computer 220, for example a desktop computer or a laptop computer running a non-mobile operating system, such as Windows™ by Microsoft™, or MacOS™ by Apple™. The mobile device 210 communicates with the user interface configuration module 200 via a mobile orchestration layer 230 of the user interface configuration module 200, whereas the computer 220 communicates with the user interface configuration module 200 via a web application module 240 of the user interface configuration module 200. The subsequent sections of the present disclosure will focus on the interaction between the mobile device 210 and the user interface configuration module 200, though the interaction between the computer 220 and the user interface configuration module 200 may be briefly discussed as well.

As shown in FIG. 2, a mobile application 250 is installed on the mobile device 210. The mobile application 250 may be an embodiment of the browser 115, the toolbar application 120, the communication application 122, the other applications 125, or the payment application 135 discussed above in association with FIG. 1. As non-limiting examples, the mobile application 250 may be an application directed to online/offline gaming, social media, electronic transactions, web browsing, media consumption, productivity management, mobile banking, file storage, file editing, E-learning, etc. As discussed above, each type of mobile application 250 may have a respective user interface that allows a user to interact with the mobile application 250. Whereas conventional mobile applications have rigid and fixed user interfaces, the mobile application 250 has a dynamically changing user interface that is customized to the particular user, depending on the context surrounding the use of the mobile application 250.

The mobile device 210 also has a software development kit (SDK) 260 installed thereon. The SDK 260 may include a set of software development or programming tools, such as application programming interfaces (APIs), libraries, documentation, etc. In some embodiments, the mobile application 250 may communicate with the user interface configuration module 200 via the SDK 260. For example, the mobile application 250 may communicate with the mobile orchestration module 230 via the SDK 260. In that regard, the mobile orchestration layer 230 orchestrates calls on behalf of the mobile application 250. For example, for the mobile application 250 to render a user interface, it may make calls to any one of the API module 1 through API module N that resides on a personalization service 300 of the user interface configuration module 200. Each of the API modules 1-N may provide a particular functionality or may correspond with a specific part of the user interface of the mobile application. For example, API module 1 may allow the user interface to display an account balance tile, API module 2 may allow the user interface to display a user activity tile, and API module N may allow the user interface to display an account quality tile, etc. The tiles are dynamically configured user interface elements that will be discussed in more detail below with reference to FIG. 3.

Still referring to FIG. 2, often times the mobile application 250 may need to make a plurality of API calls to the API modules 1-N in order to render the user interface of the mobile application 250. Rather than having the mobile application 250 make these API calls individually (e.g., one at a time)—which would be slow (e.g., long latency periods between the calls) and increase battery drain—the mobile orchestration layer 230 orchestrates all these API calls into a single API call and communicates with all the relevant API modules. After getting responses from the API modules that were called, the mobile orchestration layer 230 then returns a comprehensive result of the API calls back to the mobile application 250 altogether. In doing so, the mobile orchestration layer 230 not only reduces the latency of the mobile application 250, but also enhances the battery life of the mobile device 210, thereby improving the computer functionality of the mobile device 210.

In addition to the API modules 1-N, the personalization service 300 may also define variations, segments, and interactions, in order to provide a personalized user interface layout for the user. In that regard, a variation may refer to a user interface element that the user can see on the screen of the mobile 210. As an example, such a user interface element may be a movable tile or icon that indicates the amount of monetary balance available for a user (e.g., $10). As another example, another user interface element (that may constitute a variation) may be a card or notification that states "User X needs money."

As shown in FIG. 2, the personalization service 300 may define a plurality of variations: variations 1 through variations N, to specify all of the different user interface elements that can be displayed on the screen of the mobile device 210. It is understood that in some embodiments, the variations may be common for both the mobile platform and the web platform. In other words, each variation may be defined the same in the mobile application 250 as well as in a web browser used by the computer 220 to communicate with the user interface configuration module 200, where the web browser on the computer 220 may implement substantially similar (though not necessarily identical) functionalities as the mobile application 250 running on the mobile device 210. For case of reference, the variations 1 through N corresponding to the mobile platform are labeled herein as variations 1' through N' corresponding to the web platform.

In some embodiments, the variations 1 through N of the mobile platform may be accessed via a mobile touchpoint 310, whereas the variations 1' through N' of the web platform may be accessed via a web touchpoint 320. The mobile touchpoint 310 and the web touchpoint 320 may each include an API call, for example in the form of one of the API modules 1-N discussed above. If a variation needs to be accessed by the mobile application 250 via the mobile device 210, the mobile application 250 makes a call (e.g., through the SDK 260) to the mobile touchpoint 310. If a variation needs to be accessed by the web browser via the computer 220, the web browser makes a call (e.g., through the web application module 240) to the web touchpoint 320. It is understood that although the mobile touchpoint 310 and the web touchpoint 320 are illustrated as residing on the server (e.g., as a part of the personalization service 300), they may alternatively be implemented on the mobile device 210 or the computer 220, respectively.

Still referring to FIG. 2, each of the variations 1-N may be assigned to one or more segments 1-N. Each of the segments 1-N may define a persona or profile shared by a certain type of users, as well as the type of user interface experience that should be provided for such a type of users. For example, a persona or profile may refer to users who are new users who have just registered to be a user for the mobile application 250. These new users have not made any transactions via the mobile application 250. As such, it may be beneficial to promote a certain type of transaction to these users. For example, to encourage these new users to use the mobile application 250 to conduct electronic transactions, the segment 1 may specify that, for a user who has been determined to be a new user, the variation 1 should display a "send money" tile that informs the user that he/she can send funds electronically to another person via the mobile application 250 by clicking on the tile.

In some embodiments, in order to determine which segment a particular belongs, the personalization service 300 extracts user data from the mobile device 210 and analyzes the extracted user data. For example, as a part of the initiation registration to use the mobile application 250, the user may provide biographical data such as age, gender, ethnicity, address, employer, occupation, education, income, citizenship, hobbies, interests, goals, sexual orientation, relationships, etc. The biographical data may be sent back to the personalization engine and/or may be stored in an electronic database 350, which may be implemented as a part of the personalization service 300 or may be implemented as a separate entity from the personalization service 300.

As another example, the personalization service 300 may instruct the mobile application 250 to periodically monitor a Global Positioning System (GPS) sensor of the mobile device 210. The GPS sensor may provide the GPS coordinates of the mobile device 210, which in turns allows the mobile application to determine the geographical locations of the mobile device 210 (and thus its user). The geographical locations are then fed back to the personalization service 300, for example via the mobile orchestration module 230 or via another suitable communication module.

As yet another example, the mobile application 250 may monitor the habits of the user. The user habits may be related to financial transactions, which may include the types of products/services frequently purchased by the user, the merchants or service providers that offer the purchased products/services, the price range of the purchased product/services, the times of the day, week, month, or year in which the purchases typically occur, etc. The user habits may also be related to the user's social life, for example the identity of other users with whom the user often interacts.

Over time, the personalization service 300 may gather enough data about the user of the mobile application 250 so as to determine which segment or segments the user belongs. For example, the personalization service 300 may determine that the user is someone who in a young man in his mid 20s, with a college education and has a job with a six figure salary at an engineering firm, who is currently single but is actively dating. The personalization service 300 may also determine that the user has hobbies that include snowboarding, basketball, and hiking, as well as interests in international travelling, digital photography, and French cuisine. In addition, the personalization service 300 may determine that the user prefers to shop online as opposed to shopping at brick-and-mortar stores.

In some embodiments, the personalization service 300 may have a predefined segment for each of the above traits or behaviors of the user. For example, a segment may be defined to include all users who are in their mid 20s, another segment may be defined to include all users who shops at a particular online merchant, and yet another segment may be defined to include all users who enjoy snowboarding. Alternatively, each segment may be defined to encompass several traits or behaviors of the user. For example, a segment may be defined to include users that are in their mid 20s with a job paying a salary above a predefined threshold, like to shop at one or more particular online merchants, and enjoy snowboarding and dining out frequently. In some other embodiments, the personalization service 300 may also specifically define one or more segments to accurately capture the user's traits or behavior, if existing segments cannot describe such user information adequately.

The personalization service 300 may also specify a plurality of interactions 1-N for the segments 1-N, respectively. In that regard, an interaction may include a rule that specifies how each segment associated with the interaction should be treated. For example, suppose a segment defines a user who always shops at Starbucks while in Germany. The interaction associated with that segment may include a rule that specifies that, if the user's location has been determined to be in Germany (e.g., via the GPS sensor on the user's mobile device), and the user's account balance has reached 0, the mobile application 250 should automatically top up the user's balance by 10 Euros. As another example, for a segment that defines users who enjoy dining out frequently, the corresponding interaction may be that restaurant coupons or specials should be periodically delivered (e.g., as movable tiles) to the user interface of the mobile application 250. As yet another example, for a segment that defines users who are U.S. citizens, the corresponding interaction may be that all transactions conducted by the user should use the U.S. dollar as a default currency. As a further example, for a segment that defines an M number of other users as the users who most recently or most frequently engaged with the user on social media, the corresponding interaction may be to display a movable tile on the user interface of the mobile application 250, where the tile informs the user that he/she can send money to, or request money from, any of the M number of other users.

It is understood that although FIG. 2 illustrates a one-to-one correspondence between the variations, segments, and the interactions, that is not intended to be limiting. In some other embodiments, each variation may be associated with multiple segments, and vice versa. Similarly, each segment may be associated with multiple interactions, and vice versa.

The ability of the personalization service 300 to define the variations, segments, and/or interactions is one of the novel features of the present disclosure. Whereas conventional mobile applications define the user interface layout in a rigid and fixed manner and do not take each user's unique profile or context into account, the personalization service 300 allows the user interface layout of the mobile application 250 to be customized for each user, based on the context or environment surrounding the user.

It is understood that in the embodiment shown in FIG. 2, the analysis of the user's data, the determination of the segment(s) appropriate for the user, and/or the corresponding interaction for the user may all be determined by the personalization service 300 (which resides on the server 170), rather than by the mobile application 250 locally on the mobile device 210. For example, in response to a user executing the mobile application 250 on the mobile device 210, the mobile application 250 may send a request (e.g., via the SDK 260 and the mobile orchestration layer 230) to the personalization service 300 to display a user interface for the mobile application 250. After receiving such a request, the personalization service 300 analyzes the user data, which may include analyzing the user data stored in the database 350, and/or querying the mobile application 250 to retrieve additional user data from the mobile device 210. Based on the analysis, the personalization service 300 determines the appropriate segment(s) for the user, and possibly even defines one or more new segments for the user. Thereafter, according to the interaction assigned to the determined segment(s), the personalization service 300 sends instructions to the mobile application 250 to display one or more user interface elements (e.g., the variations) that are associated with the segment(s).

In this manner described above, the mobile application 250 itself does not make "decisions" as to how to render the user interface. Rather, these "decisions" are made by the personalization service 300, and the mobile application 250 merely executes the instructions (e.g., the "decisions") from the personalization service 300. This scheme is advantageous, because the personalization service 300 has much greater computing resources and data storage capabilities than the mobile device 210. Accordingly, the personalization service 300 can make more accurate determinations regarding the segments appropriate for the user, and make better "decisions" as to how to dynamically render a customized user interface for the user in order to best suit the user's needs.

It is also understood that, according to the architecture of the present disclosure, not only will different users experience different user interfaces-since they likely will be associated with different segments-even the same user may experience different user interfaces depending on the context in which the mobile application 250 is accessed. For example, a user who is using the mobile application 250 domestically (e.g., within the U.S.A.) may experience one type of user interface layout, where all transactions are performed using the U.S. dollar as a default currency, and most, if not all, of the functionalities of the mobile application are enabled. However, if the same user travels abroad to a different country X, he may see a different user interface of the mobile application 250. For example, the default currency may now be changed to a currency that is used in the country X. In addition, the country X may have laws or regulations that forbid some of the functionalities of the mobile application, for example sending money to another user via an email address. Consequently, the personalization service 300 may send instructions to the mobile application 250 to disable these functionalities, for example by "graying out" the relevant tiles corresponding to these functionalities, or by hiding or not displaying these relevant tiles altogether.

In some embodiments, such as in the embodiment shown in FIG. 2, the decision making of the personalization service 300 discussed above is performed by a personalization engine 400. For example, the personalization engine 400 may define the details of the variations, the segments, and the interactions, analyze the user data (either retrieved from the mobile device 210 or stored on the database 350) to determine which segment is best suited for the user, and how the user interface on the mobile application 250 should be rendered based on the determination. In some embodiments, the personalization engine 400 may include one or more computer processors and/or electronic memory storing instructions, wherein the one or more computer processors execute the stored instructions to perform the decision making discussed above.

In some embodiments, the personalization engine further includes a ranking module 410. The ranking module is configured to rank certain user interface elements above others with respect to rendering the user interface. For example, a user may be associated with a profile (e.g., segment) specifying that user interface elements (e.g., tiles) A, B, C, and D should be displayed as a part of the customized user interface for that user. However, the mobile application 250 may monitor which user interface elements the user interacts with more frequently than others. Over time, the ranking module 410 may determine (based on the reports from the mobile application 250) that the user interacts with the user interface elements A and B (e.g., corresponding to account activity and balance, respectively) more than with C and D. In response to this determination, the ranking module 410 may rank the user interface elements A and B over the user interface elements C and D. In some embodiments, the higher ranking of the user interface elements A and B may mean that they get displayed first or in a more prominent position in the user interface (e.g., at the top of the screen). In other embodiments, the higher ranking of the user interface elements A and B may mean that they will always remain displayed on the screen, even if the user navigates to different screens of the user interface, whereas the user elements C and D may become hidden when the user navigates to a screen where C and D are not typically displayed.

In some other embodiments, the ranking module 410 may also determine the precedence or priority of user segments, for example when a plurality of suitable user segments has been determined for the same user. As an example, suppose a user has been determined to belong to a first segment corresponding to U.S. citizens or residents (e.g., based on the user's registration information), as well as a second segment corresponding to someone who is currently located in Singapore (e.g., based on the geographical location of the mobile device of the user reported by the GPS unit on the mobile device). Also suppose that the interaction for the first segment specifies that the user interface should display user elements 1 through 10, but the interaction for the second segment specifies that the user interface should display user elements 1 through 5. The ranking module 410 will decide which of these segments (and thus the corresponding interaction) should take priority or precedence over the other. If the ranking module 410 decides that the first segment and the interaction associated therewith should take priority, then the ranking module 410 will instruct the mobile application 250 to display user elements 1 through 10 as a part of the user interface. If the ranking module 410 decides that the second segment and the interaction associated therewith should take priority, then the ranking module 410 will instruct the mobile application 250 to display user elements 1 through 5 as a part of the user interface.

Another aspect of the present disclosure is the ubiquity between the mobile platform and the web platform. For example, a user may make a first request to display the user interface on a screen of the mobile device 210. As discussed above, the personalization service 300 may analyze user data based on the first request, determine a segment to which the user belongs, and then instruct the mobile application to render a user interface that includes elements (e.g., the variations) associated with the segment. Sometime later, the same user may also make a second request, for example via a web browser running on the computer 220, to display the same user interface (or a similar user interface) in the web browser on a screen of the computer 220. The personalization service 300 may analyze user data again based on the second request, and if the determination is still that the user belongs to the same segment, then personalization service 300 may instruct the web browser to render a user interface similar to the one displayed by the mobile application.

Of course, there may be slight aesthetic differences (e.g., due to different screen real estate) between the user interface displayed via the mobile application and the user interface via the web browser. However, the user experience in terms of interacting with the user interfaces on the mobile platform and the web platform should be the same. As an example, supposed a tile (as a user interface element) has been previously displayed in the user interface on the mobile application 250, where the tile prompts the user to take an action, such as sending funds to another user. If the user has performed this task, then when the user interface is displayed in the web browser, such a tile no longer needs to be displayed, because the user has already taken the action associated with that tile.

Still referring to FIG. 2, the user interface configuration module 200 may include domain services 500. The domain services 500 include modules (which may be software, hardware, or both) that handle the actual execution of the actions that the user performs with the user interface. For example, the user may request to receive money from a user by clicking on a tile, or request to send money to a user by clicking on another tile, etc. The domain services 500 handle the actual movement of the funds in response to the user's actions. As shown in FIG. 2, the domain services 500 electronically communicate with the personalization service 300 to carry out these tasks.

Figure 3:
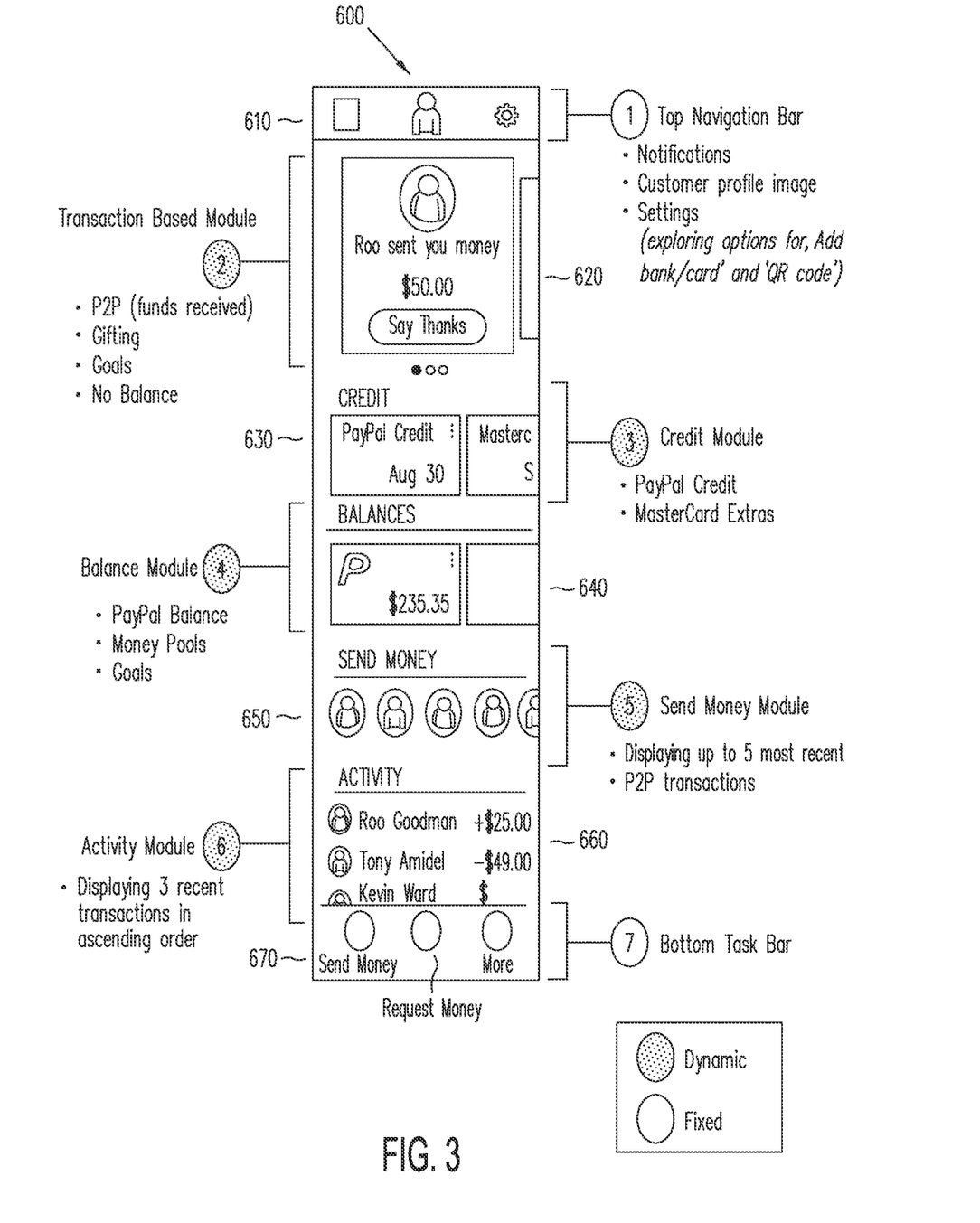
FIG. 3 illustrates an example user interface of a mobile application according to various aspects of the present disclosure.

Referring now to FIG. 3, an example user interface 600 is illustrated according to various aspects of the present disclosure. The user interface 600 may be an embodiment of the user interface displayed for the mobile application 250 on the mobile device 210 of FIG. 2. The user interface 600 includes a Top Navigation Bar 610, a Transaction Based Module 620, a Credit Module 630, a Balance Module 640, a Send Money Module 650, an Activity Module 660, and a Bottom Task Bar 670.

The Top Navigation Bar 610 and the Bottom Task Bar 670 are fixed display elements of the user interface 600 and do not change. In other words, they will always be rendered as a part of the user interface 600 regardless of who the user is, or what the context is for the user launching the user interface 600. One reason for the Top Navigation Bar 610 and the Bottom Task Bar 670 being fixed is that they include such commonplace elements that every user should or is likely to use. For example, the Top Navigation Bar 610 may include a profile picture of the user, an alert icon to inform the user of incoming notifications/alerts, and a settings icon to allow the user change or configure the settings for the user interface 600 (which may include options to add banks or generating QR codes). The Bottom Task Bar 670 may include a "Send Money" icon to allow the user to send funds electronically to another user, a "Request Money" icon to allow the user to request funds from another user, and "More" that allows the user to see additional actions.

The Transaction Based Module 620 may include one or more movable tiles that allow the user to conduct peer-to-peer (P2P) transactions, gifting, setting goals for transactions, and indicating a no balance. The Credit Module 630 may include one or more movable tiles that allow the user to request PayPal credit or to apply for other credit-card-related benefits (e.g., MasterCard Extras). The Balance Module 640 may include one or more movable tiles that allow the user to view the user's balance with PayPal, or the balance with a money pool, or goals for the balance. The Send Money Module 650 may include one or more movable tiles that allow the user to send money to a number of other users (e.g., five) with whom the user has recently conducted P2P transactions. The Activity Module 660 may include one or more movable tiles that allow the user to display recent activities of the user, for example by displaying three recent transactions in an ascending order. It is understood that the tiles or functionalities discussed above for each of the modules 620-660 may be merely examples. Other tiles or functionalities not shown in FIG. 3 or discussed above may be implemented for any of these modules 620-660 in other embodiments. In addition, the size of the tiles or the size of the modules 620-660 themselves may be dynamically adjusted, for example depending on how many tiles are included in each module. The size of the tiles may also be adjusted based on the specific user. For example, the system may determine that the user typically zooms in content or uses a larger font for display settings. In such a case, the tiles may be larger than tiles rendered for a different user who does not typically zoom in content or uses a smaller font setting.

In contrast to the Top Navigation Bar 610 and the Bottom Task Bar 670, the various modules 620-660 may be dynamically rendered. In other words, these modules 620-660 may correspond to the user interface elements (e.g., the variations in FIG. 2) that are each associated with a respective user segment. Among different users, or even for the same user who is launching the mobile application at a different time, a different location, or under a different circumstance, different modules may be rendered by the user interface 600. For example, for a first user, the modules 620-630 (but not 640-650) may be rendered, while for a different user, the modules 640-650 (but not 620-630) may be rendered. Of course, the modules herein are merely examples, and it is understood that the user interface 600 may render a plurality of other modules not shown in FIG. 3.

Based on the discussions above, it can be seen that the present disclosure pertains to an architecture in which a user interface layout for a mobile application is not hard coded into the mobile application. Rather, the user interface layout is dynamically rendered based on instructions from a remote server. However, situations may exist where the mobile application device will not be able to communicate with the remote server, for example when there is a complete loss of all network connectivity for the mobile device (e.g., no cellular signal or Wi-Fi), or when the server is down due to maintenance or unexpected failure. The architecture of the present disclosure anticipates the occurrence of such situations and provides a solution by generating a default layout for the user interface in response to a detection of a loss of network connectivity.

For example, when the mobile device 210 is able to communicate with the user interface configuration module 200 e.g., an embodiment of the server), the user interface configuration module 200 may send instructions to the mobile device 210 to collect or cache user data. The types of user data cached may be similar to the type of user data used by the personalization engine 400 to determine a user's profile (e.g., segment), similar to the discussions above.

The user interface configuration module 200 may also instruct the mobile device 210 to generate one or more default user interface layouts based on the cached user data. For example, if the cached data indicates that the user interacts with user interface elements (e.g., the different variations of FIG. 2) A, B, C, D frequently, but only sporadically with the rest of the user interface elements, then the default user interface layout may include at least the user interface elements A, B, C, D, but the rest of the user interface elements may be optionally included or omitted altogether. When the mobile device 210 detects a loss of network connectivity or is otherwise unable to communicate with the user interface configuration module 200, the mobile application 250 may render this default user interface layout, until communication with the user interface configuration module 200 is available again. In this manner, the architecture of the present disclosure provides a solution to account for unexpected situations such as loss of network connectivity, without causing major disruptions for a user experience in using the mobile application 250.

Embodiments of the present disclosure described above involve an architecture in which the user interface configuration module 200 is implemented on a server remotely located from the mobile application 210, so as to take advantage of the server's superior computing capabilities and database storage resources. However, such a scheme is not intended to be limiting unless specifically claimed. It is understood that a module similar to the user interface configuration module 200 may be implemented on the mobile device 210 in alternative embodiments. Such a module on the mobile device 210 may supplement the functionalities of the user interface configuration module 200, or even replace it altogether, for example as the hardware and/or software capabilities of the mobile device 210 progress beyond a predetermined threshold. Regardless of how the user interface configuration module 200 is implemented, the user experience for using the mobile application 250 should remain substantially the same. That is, the users will experience a dynamically changing/evolving user interface that is customized to their personal characteristics and needs.

Figure 4:
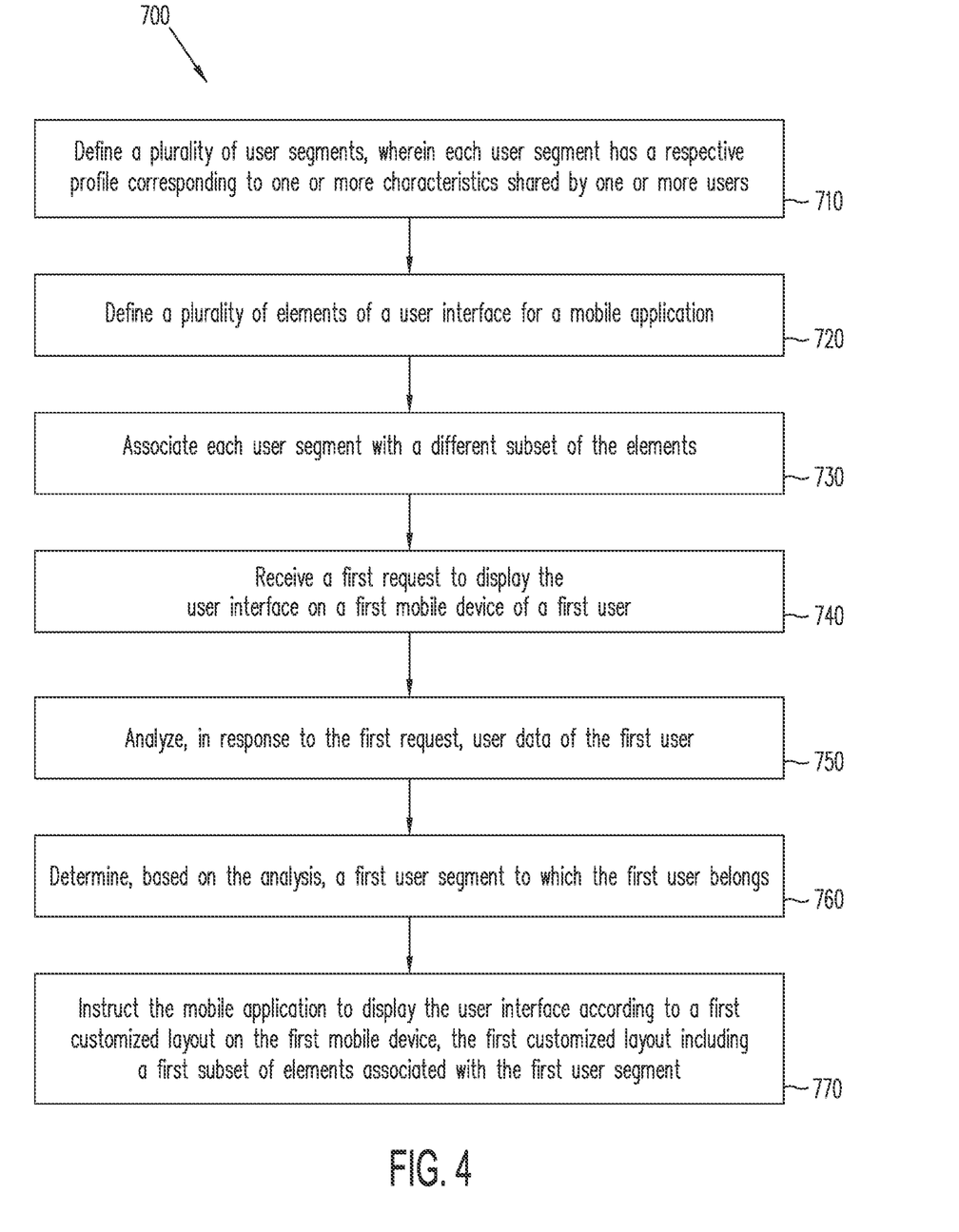
FIG. 4 is a flowchart illustrating a method of dynamically generating and rendering customized user interfaces according to various aspects of the present disclosure.

FIG. 4 is a flowchart illustrating a method 700 for dynamically generating and rendering customized user interfaces according to various aspects of the present disclosure. The method 700 includes a step 710 of defining a plurality of user segments. Each user segment has a respective profile corresponding to one or more characteristics shared by one or more users.

The method 700 includes a step 720 of defining a plurality of elements of a user interface for a mobile application.

The method 700 includes a step 730 of associating each user segment with a different subset of the elements.

The method 700 includes a step 740 of receiving a first request to display the user interface on a first mobile device of a first user.

The method 700 includes a step 750 of analyzing, in response to the first request, user data of the first user.

The method 700 includes a step 760 of determining, based on the analyzing, a first user segment to which the first user belongs.

The method 700 includes a step 770 of instructing the mobile application to display the user interface according to a first customized layout on the first mobile device. The first customized layout includes a first subset of elements associated with the first user segment.

In some embodiments, the steps 710-770 are performed by a server that is remotely located from the first mobile device.

In some embodiments, the first request is received at a first point in time, and the method 700 may include additional steps such as receiving a second request (at a second point in time different from the first point in time) to display the user interface of the mobile application on the first mobile device; analyzing, in response to the second request, user data of the first user at the second point in time; determining, based on the analyzing performed in response to the second request, a second user segment to which the first user belongs, the second user segment being different from the first user segment; and instructing the mobile application to display the user interface according to a second customized layout on the first mobile device. The second customized layout includes a second subset of elements associated with the second user segment. In some embodiments, the first request is received from a first geographical location, the second request is from a second geographical location different from the first geographical location, and the second user segment is associated with the second geographical location. In some embodiments, the first subset of elements includes at least one element associated with the first geographical location, and the second subset of elements includes at least one element associated with the second geographical location.

In some embodiments, the method 700 may include additional steps such as: receiving a second request to display the user interface on a second mobile device of a second user; analyzing, in response to the second request, user data of the second user; determining, based on the analyzing performed in response to the second request, a second user segment to which the second user belongs; and instructing the mobile application to display the user interface according to a second customized layout on the second mobile device. The second customized layout includes a second subset of elements associated with the second user segment.

In some embodiments, the method 700 may include additional steps such as: instructing the mobile application to cache data of the first user on a local memory storage of the first mobile device; and instructing the mobile application to display the user interface according to a default layout based on the cached data in response to the first mobile device detecting a loss of network connectivity.

In some embodiments, the server that performs the steps 710-770 includes a plurality of application programming interface (API) modules and an orchestration component. For example, the orchestration component is configured to perform steps that include: receiving, from the mobile application via a software development kit (SDK) residing on the first mobile device, a plurality of calls to the plurality of the API modules, respectively; consolidating the plurality of calls to a single call; sending the single call to the plurality of API modules; and returning a response to the mobile application based on the single call.

In some embodiments, the method 700 may include additional steps such as: receiving a second request to display a web-based user interface via a web browser that is running on a device of the first user that is different from the first mobile device; analyzing, in response to the second request, user data of the first user; determining, based on the analyzing performed in response to the second request, that the first user still belongs to the first user segment; and instructing the web browser to display the web-based user interface by displaying the first subset of elements associated with the first user segment. In some embodiments, the method 700 may include additional steps such as: determining, before the receiving of the second request, that the first user has already completed a task associated with a first element of the first subset of elements. In that case, the instructing the web browser comprises instructing the web browser to display the web-based user interface by displaying a rest of the elements of the first subset of elements but not the first element.

Based on the above, it can be seen that the present disclosure offers advantages over conventional methods and systems. It is understood, however, that not all advantages are necessarily discussed in detail herein, different embodiments may offer different advantages, and that no particular advantage is required for all embodiments. One advantage is improved functionality of a computer. For example, by implementing the user interface configuration module 200—which does not exist in conventional systems—the system architecture herein allows a customized user interface to be dynamically generated and rendered for a user. The user interface configuration module 200 analyzes the user data and determines a user profile that is best suited for the user based on the analysis. The user interface configuration module then instructs the mobile device to render one or more user interface elements associated with that specific user profile. Therefore, for different users using the mobile application 250, they may each see or experience a different user interface that is specifically customized to their liking and needs. Even for the same user, he may see or experience different user interfaces, for example depending on that user's geographical location or context in which the mobile application is used. As such, the versatility of the mobile device is enhanced. Another advantage is improved user experience, since each user no longer needs to interact with a rigid, one-size-fits-all type of mobile application user interface, and instead may enjoy a mobile application interface that is customized to the user's liking.

Figure 5:
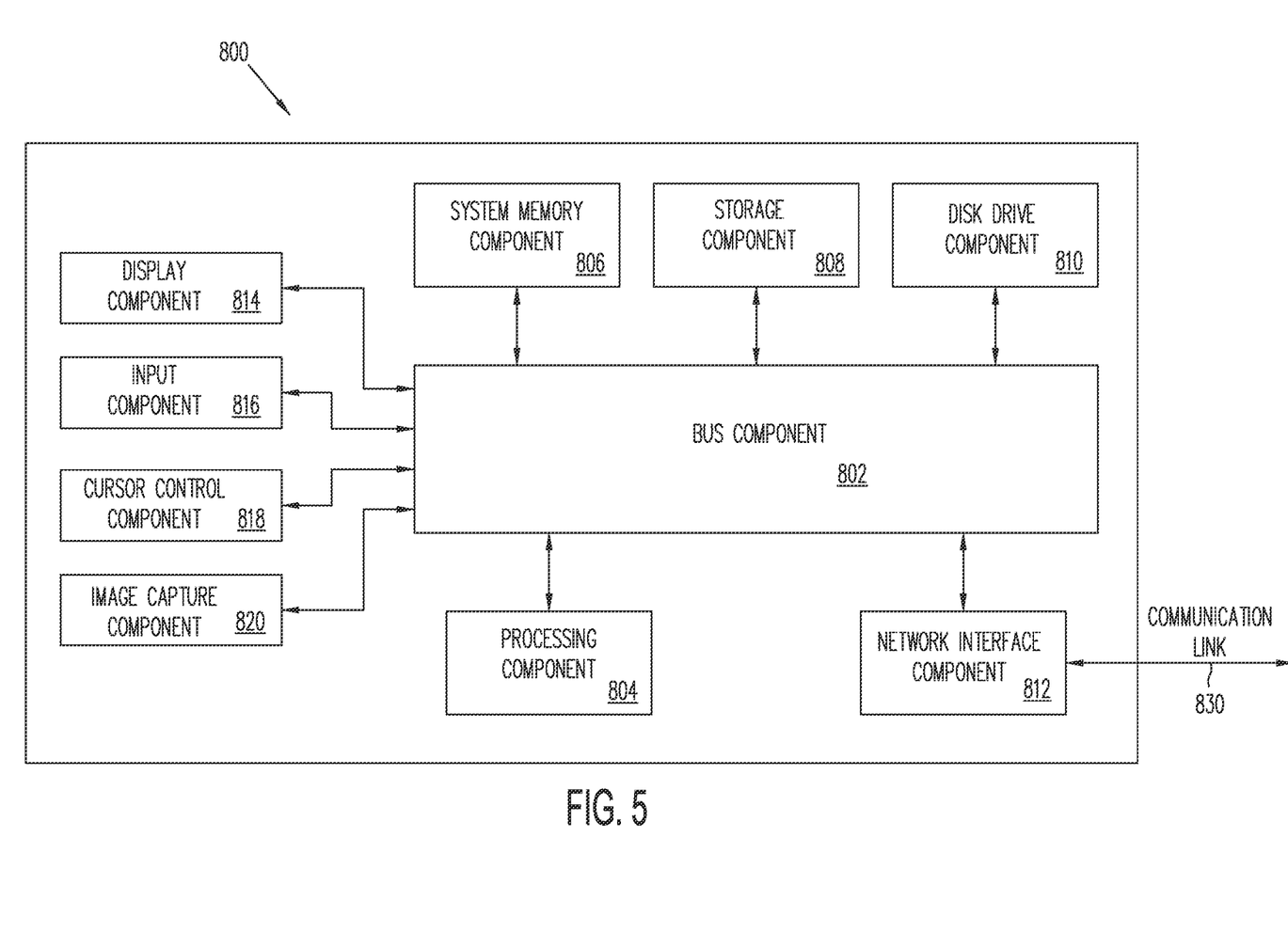
FIG. 5 is an example computer system according to various aspects of the present disclosure.

FIG. 5 is a block diagram of a computer system 800 suitable for implementing various methods and devices described herein, for example, the mobile device 110, the merchant server 140, or the payment provider server 170 of FIG. 1, or the mobile device 210 or the user interface configuration module 200 of FIG. 2, or the various method steps of the method 700 of FIG. 4. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices in FIG. 1-2 or the devices capable of performing the various method steps of FIG. 4 may be implemented as the computer system 800 in a manner as follows.

In accordance with various embodiments of the present disclosure, the computer system 800, such as a network server or a mobile communications device, includes a bus component 802 or other communication mechanisms for communicating information, which interconnects subsystems and components, such as a computer processing component 804 (e.g., processor, micro-controller, digital signal processor (DSP), etc.), system memory component 806 (e.g., RAM), static storage component 808 (e.g., ROM), disk drive component 810 (e.g., magnetic or optical), network interface component 812 (e.g., modem or Ethernet card), display component 814 (e.g., cathode ray tube (CRT) or liquid crystal display (LCD)), input component 816 (e.g., keyboard), cursor control component 818 (e.g., mouse or trackball), and image capture component 820 (e.g., analog or digital camera). In one implementation, disk drive component 810 may comprise a database having one or more disk drive components. In some embodiments, the user data may be stored in the system memory component 806 or the disk drive component 810. In some embodiments, the database 350 of FIG. 2 may also be implemented at least partially within the system memory component 806 or the disk drive component 810.

In accordance with embodiments of the present disclosure, computer system 800 performs specific operations by the processor 804 executing one or more sequences of one or more instructions contained in system memory component 806. Such instructions may be read into system memory component 806 from another computer readable medium, such as static storage component 808 or disk drive component 810. In other embodiments, hard-wired circuitry may be used in place of (or in combination with) software instructions to implement the present disclosure.

Logic may be encoded in a computer readable medium, which may refer to any medium that participates in providing instructions to the processor 804 for execution. Such a medium may take many forms, including but not limited to, non-volatile media and volatile media. In one embodiment, the computer readable medium is non-transitory. In various implementations, non-volatile media includes optical or magnetic disks, such as disk drive component 810, and volatile media includes dynamic memory, such as system memory component 806. In one aspect, data and information related to execution instructions may be transmitted to computer system 800 via a transmission media, such as in the form of acoustic or light waves, including those generated during radio wave and infrared data communications. In various implementations, transmission media may include coaxial cables, copper wire, and fiber optics, including wires that comprise bus 802.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 800. In various other embodiments of the present disclosure, a plurality of computer systems 800 coupled by communication link 830 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 800 may transmit and receive messages, data, information and instructions, including one or more programs (i.e., application code) through communication link 830 and communication interface 812. Received program code may be executed by computer processor 804 as received and/or stored in disk drive component 810 or some other non-volatile storage component for execution. The communication link 830 and/or the communication interface 812 may be used to conduct electronic communications between the mobile device 210 and the user interface configuration module 200.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the user interface configuration module 200 may be implemented as such software code.

Figure 6:
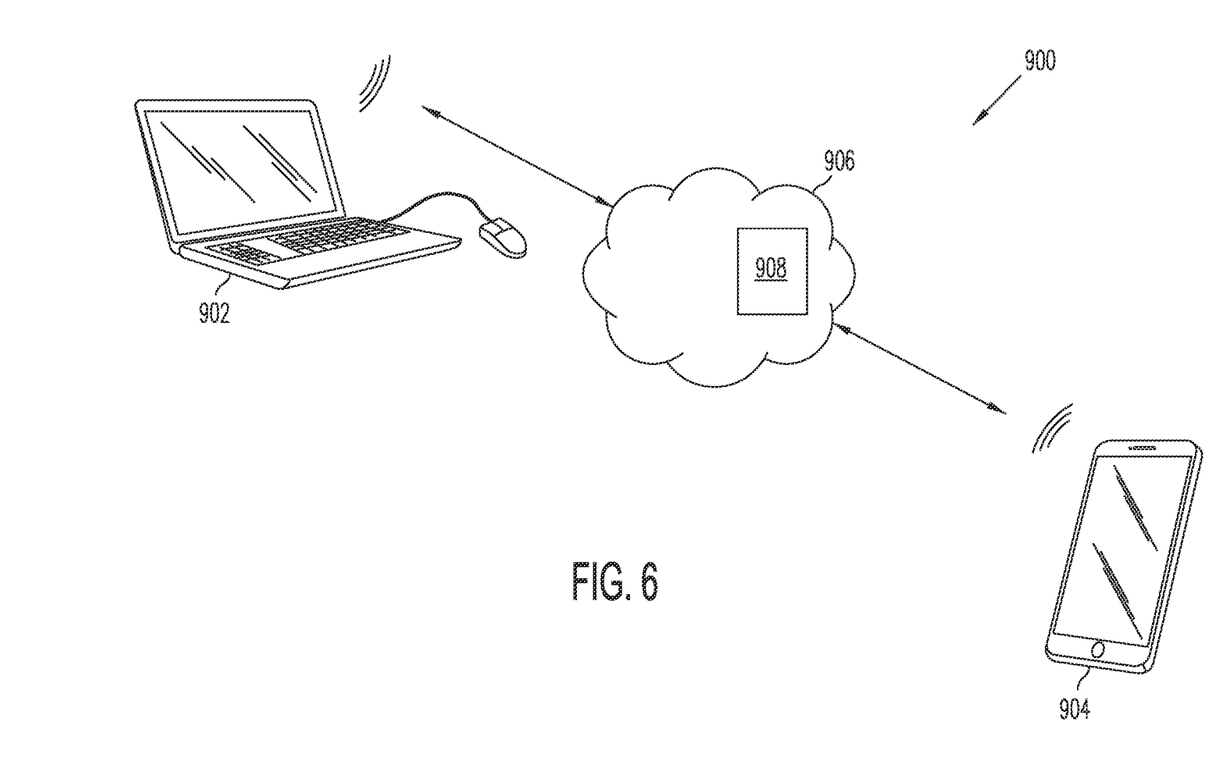
FIG. 6 is a simplified example of a cloud-based computing architecture according to various aspects of the present disclosure.

FIG. 6 illustrates an example cloud-based computing architecture 900, which may also be used to implement various aspects of the present disclosure. The cloud-based computing architecture 900 includes a mobile device 904 (e.g., the user device 110 of FIG. 1 or the mobile device 210 of FIG. 2) and a computer 902 (e.g., the merchant server 140 or the payment provider server 170 of FIG. 1, or the user interface configuration module 200 of FIG. 2), both connected to a computer network 906 (e.g., the Internet or an intranet). In one example, a consumer has the mobile device 904 that is in communication with cloud-based resources 908, which may include one or more computers, such as server computers, with adequate memory resources to handle requests from a variety of users. The user interface configuration module 200 may be implemented at least in part using the cloud-based resources 908. A given embodiment may divide up the functionality between the mobile device 904 and the cloud-based resources 908 in any appropriate manner. For example, an app on mobile device 904 may perform basic input/output interactions with the user, but a majority of the processing and analyzing may be performed by the cloud-based resources 908. However, other divisions of responsibility are also possible in various embodiments.

The cloud-based computing architecture 900 also includes the personal computer 902 in communication with the cloud-based resources 908. In one example, a participating merchant or consumer/user may access information from the cloud-based resources 908 by logging on to a merchant account or a user account at computer 902. The system and method for dynamically rendering a customized user interface for a mobile application discussed above may be implemented at least in part based on the cloud-based computing architecture 900.

It is understood that the various components of cloud-based computing architecture 900 are shown as examples only. For instance, a given user may access the cloud-based resources 908 by a number of devices, not all of the devices being mobile devices. Similarly, a merchant or another user may access the cloud-based resources 908 from any number of suitable mobile or non-mobile devices. Furthermore, the cloud-based resources 908 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

Another aspect of the present disclosure involves a method that includes the following steps: defining, by a server, a plurality of user segments, wherein each user segment has a respective profile corresponding to one or more characteristics shared by one or more users; defining, by the server, a plurality of elements of a user interface for a mobile application; associating, by the server, each user segment with a different subset of the elements; receiving, by the server, a first request to display the user interface on a first mobile device of a first user; analyzing, by the server in response to the first request, user data of the first user; determining, by the server based on the analyzing, a first user segment to which the first user belongs; and instructing, by the server, the mobile application to display the user interface according to a first customized layout on the first mobile device, the first customized layout including a first subset of elements associated with the first user segment.

One aspect of the present disclosure involves a system that includes a non-transitory memory and one or more hardware processors coupled to the non-transitory memory and configured to read instructions from the non-transitory memory to cause the system to perform operations comprising: defining a plurality of profiles, each profile including one or more characteristics that is common among a plurality of users; associating each profile with one or more elements of a user interface; determining that a mobile application has been launched on a first mobile device of a first user; accessing user data of the first user to determine at least a first profile suitable for the first user; and instructing the mobile application to render the user interface based on the first profile, such that the user interface is rendered to include at least a first element that has been associated with the first profile.

Yet another aspect of the present disclosure involves a non-transitory machine-readable medium having stored thereon machine-readable instructions executable to cause a machine to perform operations comprising: defining a plurality of user segments, wherein each user segment has a respective profile corresponding to one or more properties shared by one or more users; defining a plurality of elements of a user interface for a mobile application, wherein at least some of the elements include movable tiles; associating each user segment with a different subset of the elements; receiving a first request to display the user interface on a first mobile device of a first user; accessing, in response to the first request, user data of the first user; determining, based on the accessing of the user data in response to the first request, a first user segment to which the first user belongs; instructing the mobile application to display the user interface at least in part by rendering a first subset of elements associated with the first user segment; receiving a second request to display the user interface on a second mobile device of a second user; accessing, in response to the second request, user data of the second user; determining, based on the accessing of the user data in response to the second request, a second user segment to which the second user belongs; and instructing the mobile application to display the user interface at least in part by rendering a second subset of elements associated with the second user segment.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to execute instructions to cause the system to:
      determine a context for an interaction by a user with an application on a mobile device based on a location of the mobile device and a usage of the mobile device in association with the location;
      rank a plurality of user interface elements configurable for a layout in a user interface of the application based on the context;
      determine a rule associated with a plurality of available interface interactions for the application with the plurality of user interface elements based on the context and the user, and wherein each of the plurality of available interface interactions provides an executable application process specific to the location that is executed through a corresponding one of the plurality of user interface elements;
determine, based on the ranked plurality of user interface elements and the rule, an order of the plurality of user interface elements for a display on the user interface of the application;
determine a subset of a plurality of activity tiles displayable in the application based on the location and the usage, wherein the plurality of activity tiles enable additional interactions by the user with the application using the plurality of user interface elements, and wherein the subset restricts one or more of the additional interactions based on the location and the usage;
configure a customization of the user interface having the subset of the plurality of activity tiles based on the order of the plurality of user interface elements; and
transmit, to the mobile device, application instructions for configuring the user interface of the application using the customization of the user interface.

2. The system of claim 1, wherein the context is associated with at least one of an activity or a behavior of the user at the location, and wherein the rule presents a highest ranked one of the ranked plurality of user interface elements that is usable by the user with the activity or the behavior.

3. The system of claim 1, wherein the application instructions comprise tile configuration instructions that instruct the mobile device to configure at least one of the plurality of activity tiles specifically for at least one of the location or the context.

4. The system of claim 3, wherein executing the instructions further causes the system to:
prior to ranking the plurality of user interface elements, determine a user profile of the user, wherein the user profile includes past interactions by the user with the application; and
generate the plurality of activity tiles from a plurality of interface tile layout variations based on the user profile.

5. The system of claim 1, wherein executing the instructions further causes the system to:
restrict the application from presenting a disallowed user interface element associated with the location in the user interface.

6. The system of claim 1, wherein the plurality of user interface elements are defined by a plurality of user segments that provide variations in a display of the plurality of user interface elements based on at least one of a user trait or a user behavior.

7. The system of claim 1, wherein the plurality of user interface elements are accessed by the application via a call to a web touchpoint based at least on the application instructions.

8. A method comprising:
determining a behavior for a user associated with a mobile device based on device data of the mobile device;
determining, based on the behavior, a user segment for the user for a personalization of a user interface of an application on the mobile device,
generating a rule for the user specifying an interface interaction with the application that is specific to the user segment and one or more predicted locations of the user;
detecting a location of the mobile device;

ranking a plurality of user interface elements for the location and the application based on the rule and a context of the user at the location;
determining a subset of a plurality of activity tiles displayable in the application based on the location and the context, wherein the plurality of activity tiles enable additional interactions by the user with the application using the plurality of user interface elements, and wherein the subset restricts one or more of the additional interactions based on the location and the context;
generating instructions that customize the user interface of the application on the mobile device based on the ranking and the subset of the plurality of activity tiles, wherein the instructions cause one of the user interface elements associated with the application to be displayed in the user interface for the interface interaction; and
transmitting the instructions to the mobile device.

9. The method of claim 8, wherein the behavior corresponds to an activity that the user is engaged in at the location, and wherein the rule presents a highest ranked one of the ranked plurality of user interface elements that is usable by the user with the activity.

10. The method of claim 8, wherein the instructions comprise tile configuration instructions that instruct the mobile device to configure at least one of the plurality of activity tiles specifically for at least one of the location or the behavior.

11. The method of claim 10, further comprising:
prior to ranking the plurality of user interface elements, determining a user profile of the user, wherein the user profile includes past interactions by the user with the application; and
generating the plurality of activity tiles from a plurality of interface tile layout variations based on the user profile.

12. The method of claim 8, further comprising:
restricting the application from presenting a disallowed user interface element associated with the location in the user interface.

13. The method of claim 8, wherein the plurality of user interface elements are defined by a plurality of user segments that provide variations in a display of the plurality of user interface elements based on at least one user trait.

14. The method of claim 8, wherein the plurality of user interface elements are accessed by the application via a call to a web touchpoint based at least on the instructions.

15. A non-transitory machine-readable medium having stored thereon machine-readable instructions executable to cause a machine to perform operations comprising:
generating a profile of a user based on a user segment for the user and device usage data for a mobile device of the user, wherein the user segment is associated with a past behavior of the user;
determining a rule specifying an interface interaction for the user segment with a user interface of an application on the mobile device, wherein the rule associates the interface interaction with the user segment based on a context of the user detected at a location, and wherein the interface interaction is associated with an executable application process usable in the application at the location;
detecting the location of the user;
determining the context of the user at the location;
determining a subset of a plurality of activity tiles displayable in the application based on the location and the context, wherein the plurality of activity tiles enable additional interactions by the user with the application using a plurality of user interface elements, and wherein the subset restricts one or more of the additional interactions based on the location and the context;

generating instructions for customizing the user interface of the application on the mobile device, wherein the instructions designate one or more of the plurality of user interface elements for the subset of the plurality of activity tiles configurable for the customizing the user interface of the application for a display of the interface interaction based on the detected context and a ranking of the plurality of user interface elements; and transmitting the instructions to the mobile device.

16. The non-transitory machine-readable medium of claim 15, wherein the determining the context is based on at least one of a current activity or a current behavior of the user at the location, and wherein the rule presents a highest ranked one of the ranked plurality of user interface elements that is usable by the user with the current activity or the current behavior.

17. The non-transitory machine-readable medium of claim 15, wherein the instructions comprise tile configuration instructions that instruct the mobile device to configure the plurality of activity tiles specifically for at least one of the location or the context.

18. The non-transitory machine-readable medium of claim 17, wherein the generating the profile includes generating t the plurality of activity tiles from a plurality of interface tile layout variations based on the user profile.

19. The non-transitory machine-readable medium of claim 15, wherein the operations further comprise:
restricting the application from presenting a disallowed user interface element associated with the location in the user interface.

20. The non-transitory machine-readable medium of claim 15, wherein the one or more of the plurality of user interface elements provide a variation in a display of the application that differs from a standard display of the application based on the location and the context.

* * * * *